US008303125B2

(12) United States Patent  
Chang et al.

(10) Patent No.: US 8,303,125 B2
(45) Date of Patent: Nov. 6, 2012

(54) FOCUS APPARATUS OF IMAGE MEASURING SYSTEM

(75) Inventors: Chih-Kuang Chang, Taipei Hsien (TW); Dong-Hai Li, Shenzhen (CN); Li Jiang, Shenzhen (CN); Yi-Rong Hong, Shenzhen (CN); Xiao-Guang Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 352 days.

(21) Appl. No.: 12/763,155

(22) Filed: Apr. 19, 2010

(65) Prior Publication Data

US 2011/0149546 A1     Jun. 23, 2011

(30) Foreign Application Priority Data

Dec. 18, 2009   (CN) .......................... 2009 1 0311801

(51) Int. Cl.
*G03B 15/02* (2006.01)
*F21S 8/00* (2006.01)
*F21V 29/00* (2006.01)

(52) U.S. Cl. ................ 362/6; 362/3; 362/268; 362/294
(58) Field of Classification Search .................. 362/3, 6, 362/11; 396/106, 109, 155, 182, 199; 359/389, 359/390

See application file for complete search history.

(56) References Cited

U.S. PATENT DOCUMENTS

| | | | | |
|---|---|---|---|---|
| 2,292,044 | A * | 8/1942 | Bucky | 396/199 |
| 2,471,879 | A * | 5/1949 | Lowber et al. | 359/389 |
| 3,512,860 | A * | 5/1970 | Hansen et al. | 359/389 |
| 5,920,425 | A * | 7/1999 | Yoo et al. | 359/390 |
| 6,400,905 | B1 * | 6/2002 | Tenmyo | 396/175 |
| 6,948,823 | B2 * | 9/2005 | Pohlert et al. | 362/11 |
| 7,539,407 | B2 * | 5/2009 | Maeda | 396/199 |

* cited by examiner

*Primary Examiner* — Alan Cariaso
(74) *Attorney, Agent, or Firm* — Altis Law Group, Inc.

(57) ABSTRACT

A focus apparatus comprises a light apparatus emits the light onto an object, an optical apparatus, an image capture apparatus for receiving an image of the object through the optical apparatus, and converting the image into electronic signals, and a adapter. The adapter connects the light apparatus and the optical apparatus. The light apparatus transfers thermal energy generated by the light apparatus to the air of the surrounding environment, and scatters the light to make the light propagate uniformly.

6 Claims, 4 Drawing Sheets

FOCUS APPARATUS OF IMAGE MEASURING SYSTEM

BACKGROUND

1. Technical Field

Embodiments of the present disclosure relate to focus apparatus and, more particularly, to a focus apparatus of an image measuring system.

2. Description of Related Art

Auto-focus systems are used in optical measuring instruments, such as in image measuring systems. Generally, the auto-focus systems include an illuminator used to generate and emit light to a test object, so as place focus on the test object. However, the illuminator also generates considerable thermal energy when it emits light. The thermal energy may influence the wavelength of the light. For example, if the temperature of the illuminator is 25 degrees Celsius, the wavelength of the light may be 450 nanometers; if the temperature of the illuminator is 95 degrees Celsius, the wavelength of the light may be 700 nanometers. As a result, it is difficult to precisely focus on the test object if the wavelength of the light is changed intensely. More importantly, if the light which is projected on the surface of the test object is not uniform, it may also be difficult to precisely focus on the test object.

What is needed, therefore, is an improved focus apparatus of an image measuring system.

DETAILED DESCRIPTION

Figure 1:
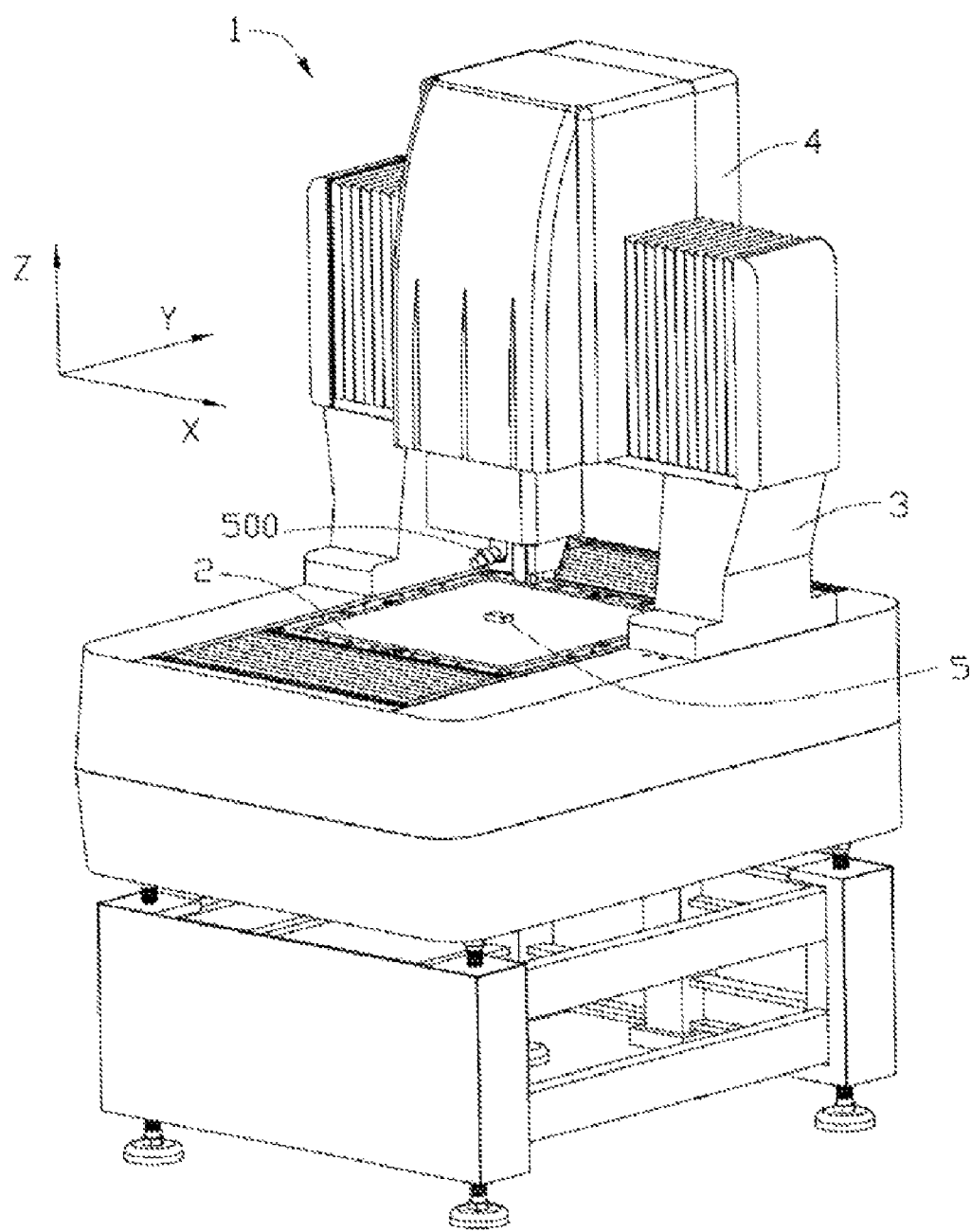
FIG. 1 is an isometric view of one embodiment of an image measuring system.
Figure 4:
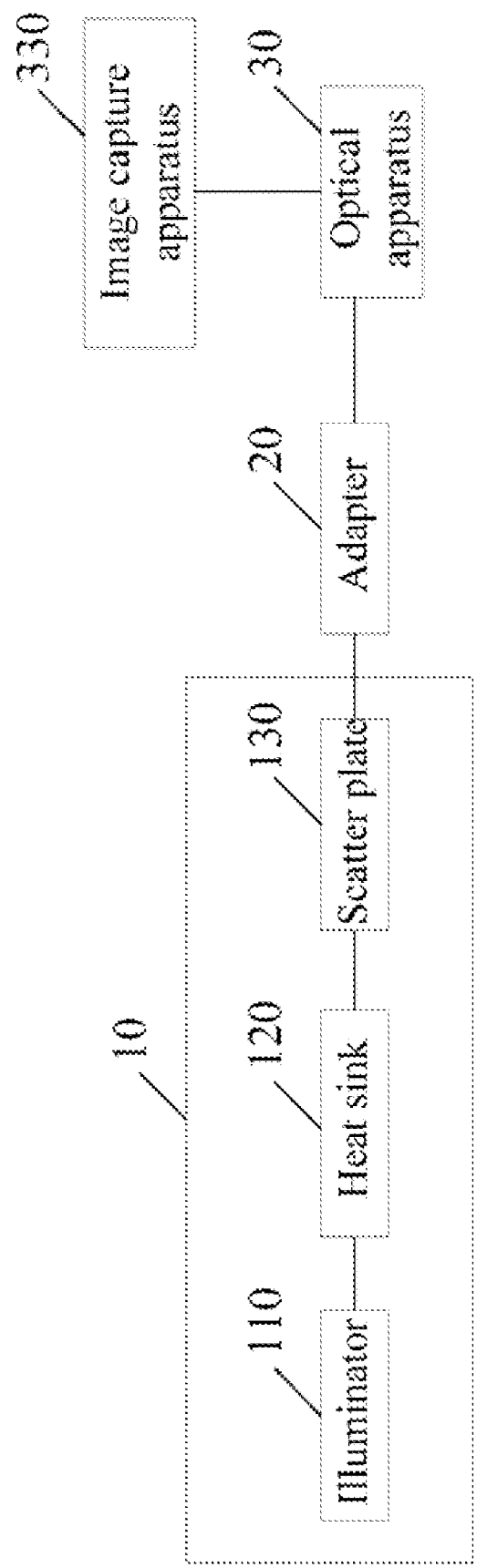
FIG. 4 is a block diagram of one embodiment of the focus apparatus of FIG. 2.

Referring to FIG. 1 and FIG. 4, one embodiment of an image measuring system 1 comprises a horizontal worktable 2, a bracket 3, a top cover 4, and a focus apparatus 500. The focus apparatus 500 comprises a light apparatus 10, an adapter 20, an optical apparatus 30, and an image capture apparatus 330. The bracket 3 is mounted to the worktable 2. The top cover 4 is mounted to a middle part of the bracket 3. The optical apparatus 30 and the image capture apparatus 330 are coupled to the top cover 4. An object 5 to be measured is positioned on the worktable 2. The image capture apparatus 330 captures an image of the object 5 via the optical apparatus 30. In one embodiment, the image capture apparatus 330 may be, but is not limited to, a charge coupled device (CCD) camera or a complementary metal oxide semiconductor (CMOS) camera.

Figure 2:
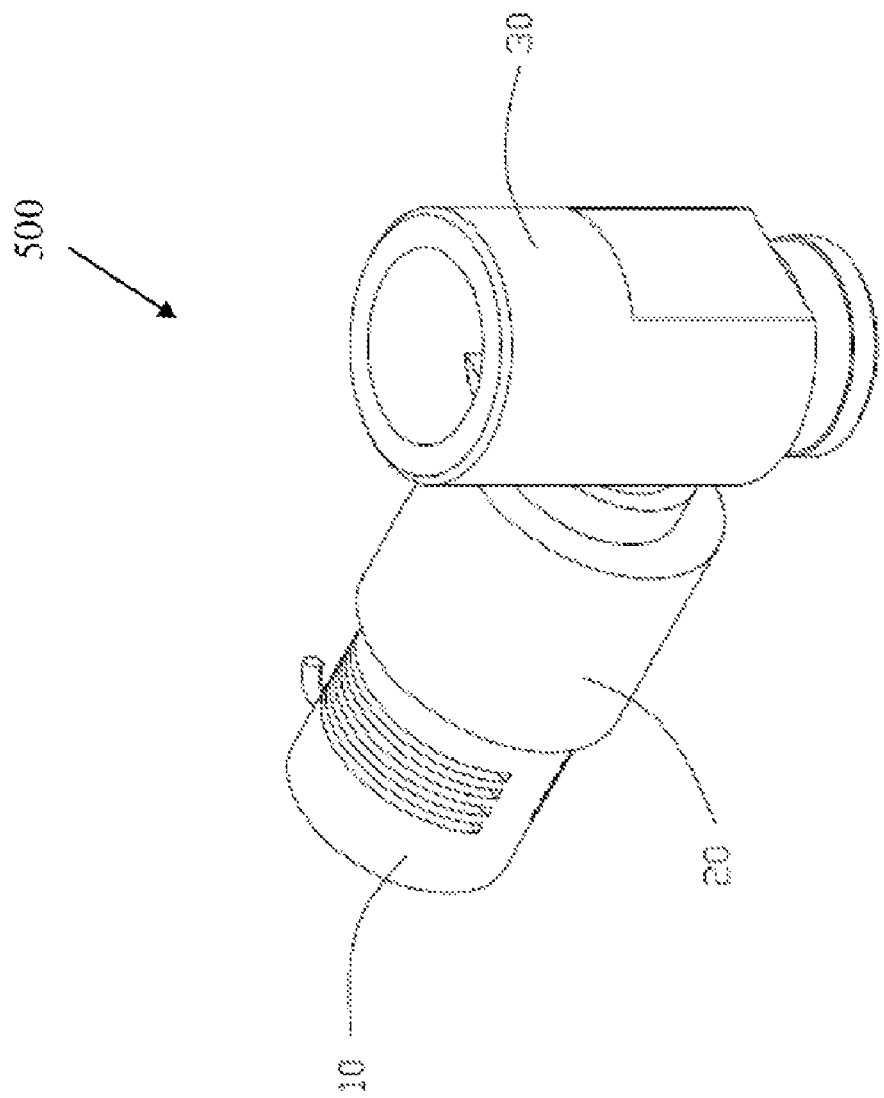
FIG. 2 is an isometric view of a focus apparatus of FIG. 1.
Figure 3:
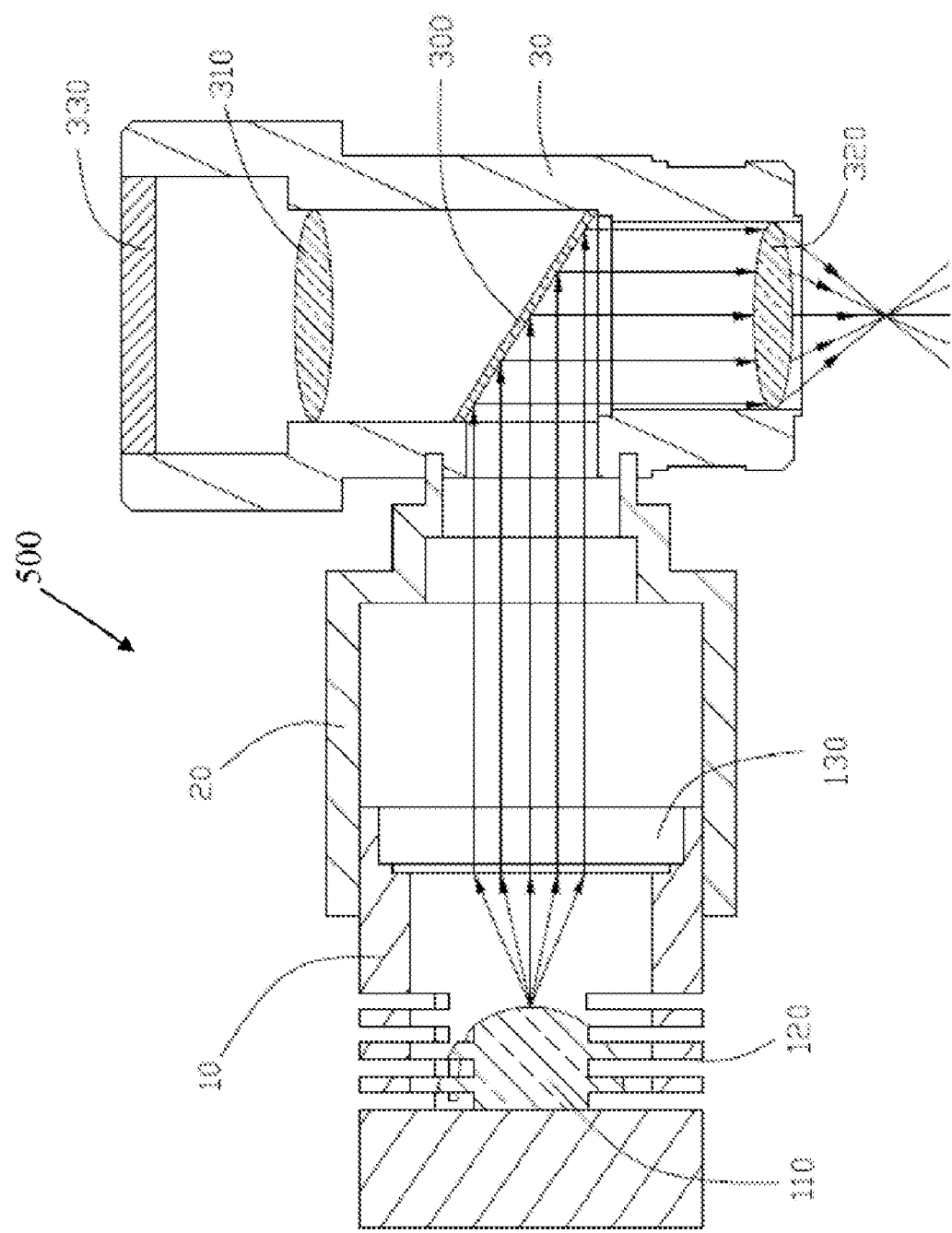
FIG. 3 is a cross-sectional view of FIG. 2.

Referring to FIG. 2 and FIG. 3, the optical apparatus 30 includes a shell, a first object lenses 310, a second object lenses 320, and a partial reflector 300. The first object lenses 310 and the second object lenses 320 are mounted to the shell. The image capture apparatus 330 is mounted to the top end of the shell, opposite to the second object lens 320, and arranged along an optical axis of the optical apparatus 30. The image capture apparatus 330 receives an image of the object 5 through the optical apparatus 30.

The partial reflector 300 is located between the first object lens 310 and the second object lens 320 and located in the shell of the optical apparatus 30. In one example, an angle between the optical axis of the optical apparatus 30 and the partial reflector 300 is about 45 degrees.

The light apparatus 10 generates light, and includes an illuminator 110, a heat sink 120, and a scatter plate 130. The illuminator 110 is located at a distal end of the shell of the light apparatus 10, and opposite to the adapter 20. The illuminator 110, the heat sink 120, the scatter plate 130 are located in the shell of the light apparatus 10 in sequence. In one embodiment, the light apparatus 10 generates the light using the illuminator 110. The illuminator 110 may be, but is not limited to, a light emitting diode (LED) illuminator or a laser. Since the illuminator 110 generates considerable thermal energy when emitting the light, the heat sink 120 transfers thermal energy generated by the illuminator 110 to the air of the surrounding environment, thus, a wavelength of the light may fall within an allowable wavelength range, such as 450~600 nanometers. In one embodiment, the heat sink 120 may be, but is not limited to, an aluminum heat sink, a copper heat sink, a copper-aluminum heat sink, or a heat pipe. The scatter plate 130 may scatter the light to make the light propagate uniformly. In one embodiment, the scatter plate 130 may be, but is not limited to, an acrylic plate.

As shown in FIG. 3, the adapter 20 connects the light apparatus 10 and the optical apparatus 30. In one embodiment, the light apparatus 10 is perpendicularly mounted to a circumference of an end of the adapter 20. The adapter 20 is perpendicularly mounted to middle location of the optical apparatus 30.

The light generated by the illuminator 110 passes through the heat sink 120, the scatter plate 130, the semi-transparent reflector 300, and the second object lens 320. The image capture apparatus 330 receives an image of the object 5 through the optical apparatus 30, converts the image into electronic signals, and then transmits the electronic signals to the computer system. The computer system computes a focus setting for precisely focusing on the object 5 according to the contrast of the image of the object 5.

The foregoing description of the exemplary embodiments of the disclosure has been presented only for the purposes of illustration and description and is not intended to be exhaustive or to limit the disclosure to the precise forms disclosed. Many modifications and variations are possible in lights of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A focus apparatus, comprising:
   a light apparatus operable to generate light and emit the light onto an object;
   an optical apparatus operable to generate an image of the object, wherein the optical apparatus comprises a first object lens, a second object lens, and a partial reflector located between the first object lens and second object lens, and wherein the partial reflector is not parallel to the second object lens;
   an image capture apparatus operable to receive the image of the object from the optical apparatus, and convert the image into electronic signals;

an adapter operable to connect the light apparatus and the optical apparatus; wherein the light apparatus comprises a heat sink and a scatter plate, wherein the light generated by the light apparatus passes through the heat sink, the scatter plate, the adapter, the partial reflector, and the second object lens to project the light onto the surface of the object, wherein the heat sink transfers thermal energy generated by the light apparatus to the air of the surrounding environment to make a wavelength of the light fall in an allowable wavelength range, and wherein the scatter plate scatters the light to make the light propagate uniformly.

2. The focus apparatus of claim 1, wherein the light apparatus further comprises an illuminator to generate the light.

3. The focus apparatus of claim 2, wherein the illuminator is a light emitting diode (LED) illuminator or a laser.

4. The focus apparatus of claim 1, wherein the heat sink is selected from the group consisting of an aluminum heat sink, a copper heat sink, a copper-aluminum heat sink, and a heat pipe.

5. The focus apparatus of claim 1, wherein the scatter plate is an acrylic plate.

6. The focus apparatus of claim 1, wherein the optical apparatus is a charge coupled device (CCD) camera or a complementary metal oxide semiconductor (CMOS) camera.

* * * * *